(12) United States Patent
Stewart

(10) Patent No.: US 10,725,370 B2
(45) Date of Patent: Jul. 28, 2020

(54) SENSOR LOGIC CONTROL OF GUN CAMERA

(71) Applicant: David A. Stewart, Boca Raton, FL (US)

(72) Inventor: David A. Stewart, Boca Raton, FL (US)

( * ) Notice: Subject to any disclaimer, the term of this patent is extended or adjusted under 35 U.S.C. 154(b) by 0 days.

(21) Appl. No.: 16/193,458

(22) Filed: Nov. 16, 2018

(65) Prior Publication Data

US 2019/0146321 A1   May 16, 2019

Related U.S. Application Data

(60) Provisional application No. 62/587,172, filed on Nov. 16, 2017.

(51) Int. Cl.
| | |
|---|---|
| *G03B 29/00* | (2006.01) |
| *G06F 1/3206* | (2019.01) |
| *F41J 5/10* | (2006.01) |
| *H04N 5/76* | (2006.01) |
| *H04N 5/232* | (2006.01) |
| *H04N 5/77* | (2006.01) |
| *F41G 3/26* | (2006.01) |
| *F41A 33/00* | (2006.01) |

(52) U.S. Cl.
CPC .............. *G03B 29/00* (2013.01); *F41A 33/00* (2013.01); *F41G 3/2605* (2013.01); *F41J 5/10* (2013.01); *G06F 1/3206* (2013.01); *H04N 5/232411* (2018.08); *H04N 5/76* (2013.01); *H04N 5/772* (2013.01)

(58) Field of Classification Search
None
See application file for complete search history.

(56) References Cited

U.S. PATENT DOCUMENTS

| | | | | |
|---|---|---|---|---|
| 9,267,761 | B2 * | 2/2016 | Stewart | F41G 11/002 |
| 2013/0169820 | A1 * | 7/2013 | Stewart | H04N 5/225 |
| | | | | 348/169 |
| 2015/0369554 | A1 * | 12/2015 | Kramer | H04N 9/8205 |
| | | | | 386/227 |
| 2017/0248388 | A1 * | 8/2017 | Young | F41C 33/029 |

* cited by examiner

*Primary Examiner* — Stuart D Bennett
(74) *Attorney, Agent, or Firm* — Fleit Intellectual Property Law; Jon Gibbons

(57) ABSTRACT

The present invention relates to the process where a gun video camera is controlled by logic functions using inputs from sensors monitoring the gun and environmental characteristics. More particularly, a control signal is generated which determines the wake-up time of a camera in sleep mode and the recording time of video and data capture of the camera.

17 Claims, 5 Drawing Sheets

- Accelerometer x axis threshold crossing.
- Accelerometer y axis threshold crossing.
- Accelerometer z axis threshold crossing.
- Magnetic sensor x axis threshold crossing.
- Magnetic sensor y axis threshold crossing.
- Magnetic sensor z axis threshold crossing.
- Gyroscope pitch threshold crossing.
- Gyroscope roll threshold crossing.
- Gyroscope yaw threshold crossing.
- Gun cant threshold crossing.
- Gun incline threshold crossing.
- GPS Latitude threshold crossing.
- GPS Longitude threshold crossing.
- Temperature threshold crossing.
- Lighting level threshold crossing.
- User ON/OFF switch with digital output.
- Headquarters ON/OFF switch with digital output.
- Communications ON/OFF switch with digital output.
- Weapons ON/OFF switch with digital output.

FIG. 3

401  0    //range[0,1] Gyro and G force wake-up logic function:0-"OR", 1-"AND"
402  0    //range[0,1] G force wake-up logic function:0-"OR", 1-"AND"
403  12   //range[0,24] x axis wake-up G force threshold
404  12   //range[0,24] y axis wake-up G force threshold
405  12   //range[0,24] z axis wake-up G force threshold
406  1    //range[0,1] Gyro wake-up logic function:0-"OR", 1-"AND"
407  600  //range[0,2000] pitch wake-up gyro threshold
408  600  //range[0,2000] roll wake-up gyro threshold
409  600  //range[0,2000] yaw wake-up gyro threshold
410  1    //range[0,1] Gyro and G force shot trigger logic function:0-"OR", 1-"AND"
411  1    //range[0,1] G force shot trigger logic function:0-"OR", 1-"AND"
412  8    //range[0,24] x axis shot trigger G force threshold
413  16   //range[0,24] y axis shot trigger G force threshold
414  2.4  //range[0,24] z axis shot trigger G force threshold
415  1    //range[0,1] Gyro shot trigger logic function:0-"OR", 1-"AND"
416  200  //range[0,2000] pitch shot trigger gyro threshold
417  350  //range[0,2000] roll shot trigger gyro threshold
418  250  //range[0,2000] yaw shot trigger gyro threshold

FIG. 4

SENSOR LOGIC CONTROL OF GUN CAMERA

FIELD OF THE INVENTION

This invention generally relates to cameras mounted on firearms and more specifically to processes for controlling the timing of video capture of images of a target, and/or the shooter.

BACKGROUND OF THE INVENTION

Video mounted camera on fire arms have been around for years. Capturing the video of events important to a shooter is a challenge. Shooters do not want to edit video or waste storage on recording video that does not capture data relevant to their shots.

SUMMARY OF THE INVENTION

The invention will aid the shooter by letting them control the parameters which cause the video camera to wake-up and record video and data from their shots.

This invention has specific application in the hunting, target shooting, military, and law enforcement fields. However, it can be utilized in any field where it is helpful to control a video camera on a shooting device. The primary example used in the figures and description will be the case in which a pistol is being used to shoot at paper targets at a suitable target range facility.

The invention allows the capturing of data at the time around the discharge of a gun, bow, or shooting device and the control of the timing of image capture prior to discharge, around point of discharge, and post discharge in a manner that allows the shooter to analyze the images and data. The present invention relates to the process where a gun video camera is controlled by logic functions using inputs from sensors monitoring the gun and environmental characteristics. More particularly, a control signal is generated which determines the wake-up time of a camera in sleep mode and the recording time of video and data capture of the camera.

Accordingly, the present invention is directed, in part, to a system and method for the control of a video recording device by digital logic functions using sensor outputs comprising:

- a video and data recording system that is controlled by a digital signal generated from some combination of AND, NAND, OR, or NOR functions.
- a system wake-up signal that is controlled by a digital signal generated from some combination of AND, NAND, OR, or NOR functions.
- The logic input to these function gates is in turn derived from threshold levels of sensor data in logical combination from real time sensor data to detect threshold crossings.
- The thresholds of sensor data are derived from user inputs associated with environmental conditions, shooting conditions, shooting device characteristics, shot characteristics, and desired video recording times and data.

The present invention is additionally directed, in part, to processes for correction of shooting errors, comprising:

- Aiming at the target incorrectly.
- Pulling the trigger incorrectly.
- Using the shooting device incorrectly.
- Not controlling the movement of the shooting device during the shooting sequence.
- Not controlling the timing of the shots during the shooting sequence.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 shows a table of potential sensor inputs to control system wake-up and video recording and data capture of the shooting scenario;

FIG. 4 shows an example configuration file to control system wake-up and video recording and data capture of the shooting scenario.

DETAILED DESCRIPTION OF INVENTION

Figure 1:
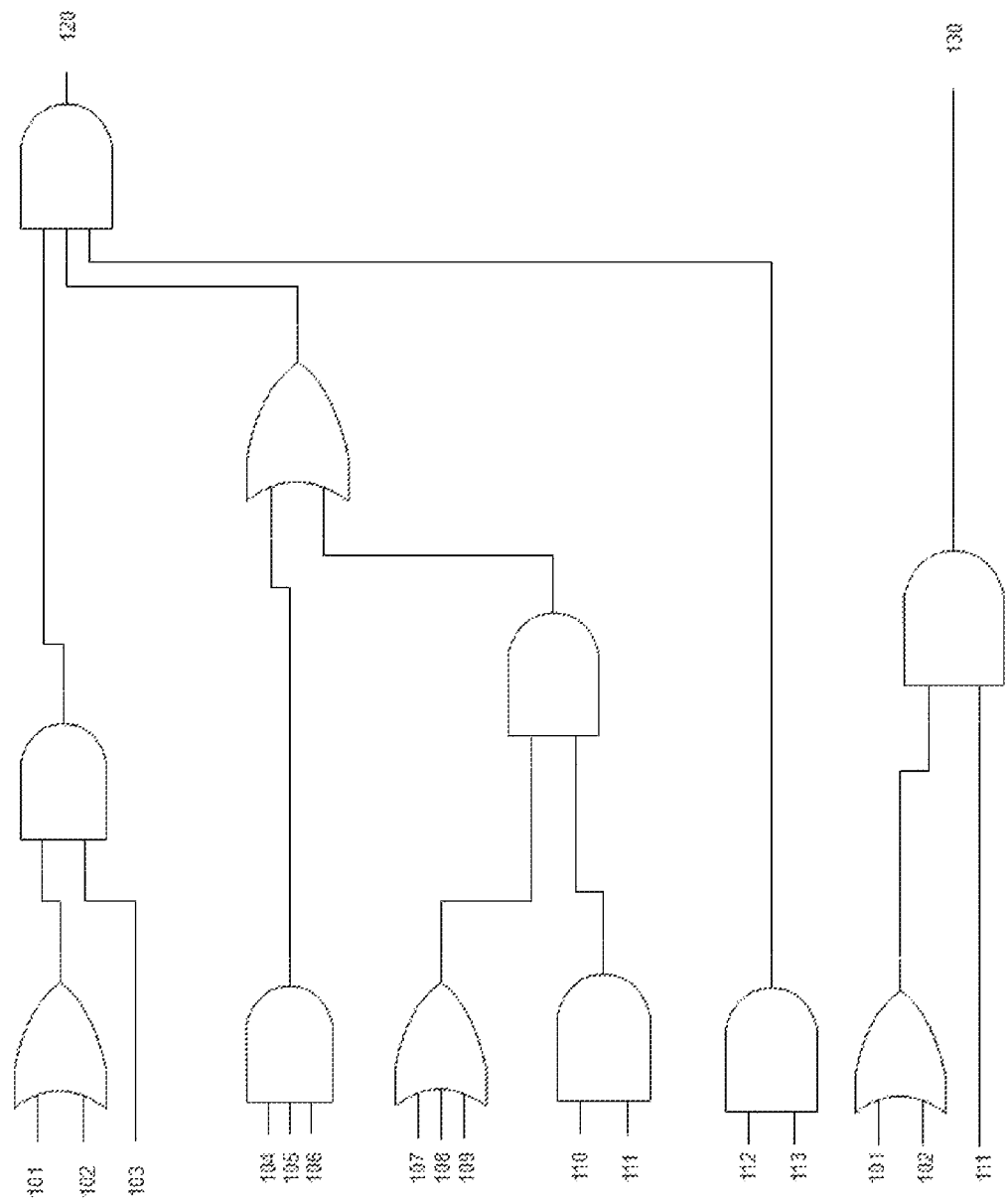
FIG. 1 shows a logic diagram of camera control logic for video and data recording, and for system wake-up.

The present invention is generally directed to the process for the capture of video, slow motion, still images, and target shooting data. More particularly, the present invention relates to controlling video and data capture to give the shooter the visual representation of the target, or the shooter, or both.

Some advantages of the methods of the present invention include, in certain embodiments, the ability to allow the system to go into sleep mode during times when shots are not being taken. The ability to only record the useful video and data in the times just before during and after the shot.

As employed above and throughout the disclosure, the following terms, unless otherwise indicated, shall be understood to have the following meanings.

The examples provided in the definitions present in this application are non-inclusive unless otherwise stated. They include but are not limited to the recited examples.

As used herein, the term "shooting device" includes all equipment designed to launch projectiles at a target area.

It is believed the names used herein correctly and accurately reflect the underlying components, and process equipment. However, the nature and value of the present invention does not depend upon the theoretical correctness of these, in whole or in part. Thus, it is understood that the names attributed to the correspondingly indicated components, and process equipment are not intended to limit the invention in any way.

Accordingly, the present invention is directed, in part, to a system and method for the control of a video recording device by digital logic functions using sensor outputs comprising:

- a video recording system that is controlled by a digital signal generated from some combination of AND, NAND, OR, or NOR functions.
- The logic input to these function gates is in turn derived from threshold levels of sensor data in logical combination from real time sensor data to detect threshold crossings.

The thresholds of sensor data are derived from user inputs associated with environmental conditions, shooting conditions, shooting device characteristics, shot characteristics, and desired video recording times and data.

The present invention is additionally directed, in part, to processes for correction of shooting errors, comprising:

Aiming at the target incorrectly.

Pulling the trigger incorrectly.

Using the shooting device incorrectly.

Not controlling the movement of the shooting device during the shooting sequence.

Not controlling the timing of the shots during the shooting sequence.

In certain preferred embodiments, the sensor thresholds for the control logic may be mechanically adjusted using switches or analog-to-digital input devices.

In certain preferred embodiments, the camera may be mounted facing back towards the shooter. This allows the technique of the shooter during the mounting, discharging, and follow-through of the shooting device to be recorded. The camera may be mounted facing back towards the shooter in any position on the shooting device and will be determined by the desired images and the left or right handedness of the shooter.

In certain preferred embodiments, the camera may have a Field Of View (FOV) both towards the shooter and towards the target. This allows the technique of the shooter during the mounting, discharging, and follow-through of the shooting device to be simultaneously recorded with the target images. The bi-directional camera may be mounted in any position that the user determines will have suitable FOV's.

In certain more preferred embodiments the sensor outputs shall be from an accelerometer, a gyroscope, a magnetic sensor, a microphone, a muzzle flash sensor, an optical sensor, a cant sensor, an incline sensor, a mechanical sensor, an electrical sensor, or some combination of sensors.

In certain embodiments the camera device will have a gravitational sensor that will be utilized to orientate the output images with gravity downwards in the images. This enables the playback images to be independent of camera orientation during recording. If for example a gun mounted camera device was transitioned from lying on its side to the normal shooting orientation the output images would always show the bottom of the image towards the earth, i.e. down on the image would be in line with gravitational pull.

A logic diagram representation of the invention is shown in FIG. 1. These illustrations are not meant to limit the invention in any way. The camera device is controlled by output 120. This control is more particularly the control of camera recording time and data collection time. When the logic output 120 changes state as a result of sensor input levels the video camera will capture both video and data associated with the event that caused the control signal 120 to change state. The output control can be used to signal an event where the data and video before during and after the event are captured. The video and data prior to the event can be retrieved from memory buffer to give a continuous video and data stream recording of before during and after the event.

The camera device sleep mode controlled by output 130. This control is more particularly the control of camera wake-up time in anticipation of a shot being taken. When the logic output 130 changes state as a result of sensor input levels the video camera will wake-up. When the camera is awake it is ready to start recording video or data, or buffering video or data for potential recoding after an event is detected.

The logic diagram in FIG. 1 shows AND and OR functions. Any type of logic function could be used. In addition, the detection of sensor levels crossing thresholds may require latching the data using a flip-flop function, digital latch, or electronics latch.

The logic diagram inputs shown in FIG. 1 are:

101 Accelerometer x axis threshold crossing.

102 Accelerometer y axis threshold crossing.

103 Accelerometer z axis threshold crossing.

104 Magnetic sensor x axis threshold crossing.

105 Magnetic sensor y axis threshold crossing.

106 Magnetic sensor z axis threshold crossing.

107 Gyroscope pitch threshold crossing.

108 Gyroscope roll threshold crossing.

109 Gyroscope yaw threshold crossing.

110 Gun cant threshold crossing.

111 Gun incline threshold crossing.

112 GPS Latitude threshold crossing.

113 GPS Longitude threshold crossing.

Any logic function can be used to control the outputs 120 and 130. A simple case would be an AND function where a combination of acceleration from recoil in the y direction and a gun incline above a threshold level are used to control the shot output 120. Another simple case would be the gun incline sensor being used to control wake-up output 130. In the case shown in FIG. 1 it is a more complex logic function utilizing 13 sensor inputs.

Figure 2:
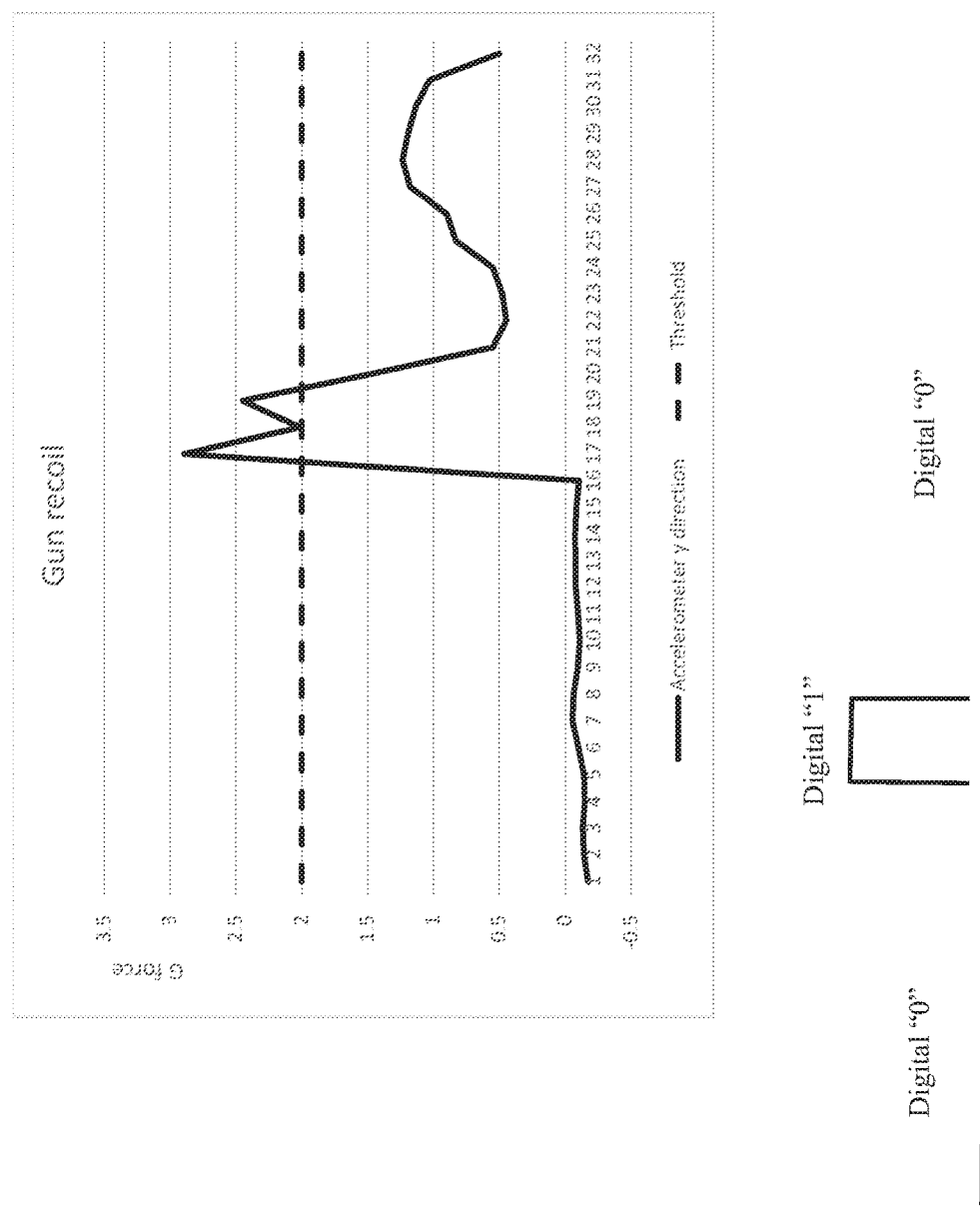
FIG. 2 shows a representation of the techniques used to set sensor thresholds.

FIG. 2 the shows the example where the digital output of the accelerometer y direction is compared to a threshold level to set the digital input to the logic diagram shown in FIG. 1. In this example the input 102 Accelerometer y axis threshold crossing would be a "0" up to the point in time where the acceleration in the y direction crosses the 2 g threshold and then becomes a "1".

FIG. 3 is a table of examples of sensor inputs. These sensor inputs can be converted to a binary signal and input to the sensor logic as shown in the FIG. 1 example. The binary signal can be a result of a sensor output crossing a threshold, the derivative of the sensor output crossing a threshold, the integral of the sensor output crossing a threshold, the electronic latching of the sensor output crossing a threshold, or any other chosen function of sensor output that is transformed into a binary signal that is in turn input to the sensor logic as shown in the example of FIG. 1.

FIG. 4 is an example of a control file used to set the thresholds and sensor logic to control the "wake-up" of a video camera and the recording of video and data associated with a "shot". The "shot" event is being generated by the sensor outputs crossing thresholds during gun recoil. The accelerometer thresholds are a G force setting for an axis. Acceleration is often measured in G's with 1 G equaling the force of gravity. This accelerometer sensor in this example has an output range of 0 to 24 G.

The gyroscope thresholds are a setting for an axis. Pitch, roll, and yaw are often measure in degrees per second (dps). This gyroscope sensor in this example has an output range of 0 to 2000 dps.

Line 401 shows that the logic function "OR" has been selected. This means that the output from the logic gating the 3 separate accelerometer axis readings is combined with the logic gating the 3 separate gyroscope axis readings in an "OR" function.

Line 402 shows that the 3 separate accelerometer axis readings are gated with the "OR" function.

Lines 403, 404, and 405 show that the 3 accelerometer axis thresholds have been set to 12 G.

Line 406 shows that the 3 separate gyroscope axis readings are gated with the "AND" function.

Lines 407, 408, and 409 show that the 3 gyroscope axis thresholds have been set to 600 dps.

The result of the logic and thresholds above will control the "wake-up" of the video camera. An example of when this "wake-up" logic would be used is to wake the camera from sleep mode when the action of a gun is detected as closing based on the thresholds associated with a gun action closing.

Line 410 shows that the logic function "AND" has been selected. This means that the output from the logic gating the 3 separate accelerometer axis readings is combined with the logic gating the 3 separate gyroscope axis readings in an "AND" function.

Line 411 shows that the 3 separate accelerometer axis readings are gated with the "AND" function.

Lines 412 shows that the accelerometer x axis threshold has been set to 8 G.

Lines 413 shows that the accelerometer y axis threshold has been set to 16 G.

Lines 414 shows that the accelerometer z axis threshold has been set to 2.4 G.

Line 415 shows that the 3 separate gyroscope axis readings are gated with the "AND" function.

Lines 416 shows that the gyroscope pitch threshold has been set to 200 dps.

Lines 417 shows that the gyroscope roll threshold has been set to 350 dps.

Lines 418 shows that the gyroscope yaw threshold has been set to 250 dps.

The result of the logic and thresholds above will control the "shot" video and data recording. An example of when this "shot" logic would be used is to record the video and data around the time of gun recoil based on the thresholds associated with a gun recoil at the time of firing a shot.

When ranges are used herein for physical properties, such as acceleration or location, all combinations and sub combinations of ranges and specific embodiments therein are intended to be included.

The disclosures of each patent, patent application and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

Figure 5:
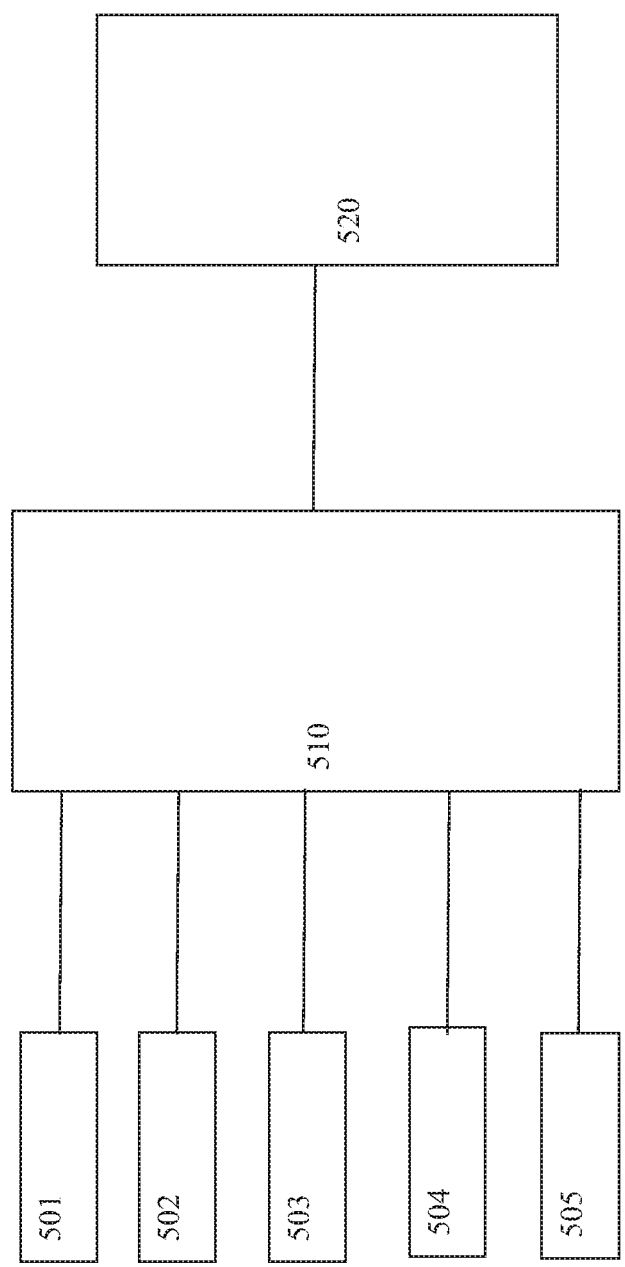
FIG. 5 shows a block diagram of potential key camera system components for control of video and data recording, and for system wake-up.

FIG. 5 shows a block diagram of potential key camera system components for control of video and data recording, and for system wake-up. In this example the sensors are an accelerometer 501, a digital compass 502, a gyroscope 503, a cant and incline sensor 504, and a GPS 505. The outputs of the various sensors are input to the logic control system 510. The logic control system 510, controls the recording times, data collection, and system wake-up of camera 520.

FIG. 5 is a pictorial representation for the sake of clarity. In practical terms the camera system components may be integrated into a "System on a Chip" (SoC) where some, or all, of the sensors are part of the SoC. The logic control system 510 is in most practical cases not separate hardware and is implemented in software, either in the SoC or the video processor.

Computer Program Product Example

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A system to control video and data recording system mounted on a shooting device comprising:
    a video and data recording system for recording video images of an aim of a shooting device;
    non-volatile storage storing one or more user inputs associated with one or more of environmental conditions, shooting conditions, shooting device characteristics, shot characteristics, desired data and video times, or a combination thereof;
    a logic system including a plurality of logic functions controlled by a digital signal generated inputs from an accelerometer and at least one additional non-accelerometer sensor type, wherein logic input to the plurality of logic functions is derived from sensor data to produce one or more logic function outputs including a wake-up output to change the video and data recording system from a low power state to an operating mode in anticipation of a shot being fired by the shooting device and a shot output to start recording of a video by the camera, the shot output activated by an accelerometer sensor and at least one of a magnetic sensor, a gyroscope sensor, or a combination thereof, exceeding thresholds for sensor data, wherein the thresholds for sensor data are derived from the one or more user inputs in the non-volatile storage;
    wherein the video and data recording system that is returned to operating mode from a low power state by the wake-up output and the video and data recording system begins recording in response to receiving the shot output and after the wake-up output is received; and
    wherein the thresholds for sensor data comprise at least a first threshold for the wake-up output and a second threshold for the shot output, the second threshold being greater than the first threshold.

2. The system according to claim 1, wherein the video and data recording device records a video and data stream including
    a recording of a time prior to shooting device discharge in a range of 0 to 30 seconds; and
    a recording of a time around shooting device discharge in a range of 0 to 5 seconds;
    a recording of a time after shooting device discharge in a range of 0 to 30 seconds; or
    a combination thereof.

3. The system according to claim 1, wherein the video and data recording device records a video and data stream including
    a recording of a time prior to shooting device discharge in a range of 0 to a maximum time allowed by available memory; and
    a recording of a time around shooting device discharge in a range of 0 to a maximum time allowed by available memory;
    a recording of a time after shooting device discharge in a range of 0 to a maximum time allowed by available memory; or
    a combination thereof.

4. The system according to claim 1, wherein the wake-up output is activated by at least one global positioning (GPS) sensor.

5. The system according to claim 1, wherein the wake-up output is activated by at least one a gyroscope sensor.

6. The system according to claim 1, wherein the wake-up output is activated by an accelerometer sensor and at least one of a global positioning (GPS) sensor, a gyroscope sensor or a combination thereof.

7. A method for controlling video and data recording of a camera mounted on a shooting device comprising:
  operating a camera for recording video images of an aim of a shooting device;
    receiving one or more user inputs associated with one or more of environmental conditions, shooting conditions, shooting device characteristics, shot characteristics, desired data and video times, or a combination thereof;
    controlling a logic system including a plurality of logic functions by a digital signal generated inputs from an accelerometer and at least one additional non-accelerometer sensor type, wherein logic input to the plurality of logic functions is derived from sensor data to produce one or more logic function outputs, including a wake-up output to change the video and data recording system from a low power state to an operating mode in anticipation of a shot being fired by the shooting device and a shot output to start recording of a video by the camera, the shot output activated by an accelerometer sensor and at least one of, a magnetic sensor, a gyroscope sensor, or a combination thereof, exceeding thresholds for sensor data, wherein the thresholds for sensor data are derived from the one or more user inputs;
    initiating an operating mode from a low power state by the wake-up output and the video and data recording system begins recording in response to receiving the shot output and after the wake-up output is received; and
  wherein the thresholds for sensor data comprise at least a first threshold for the wake-up output and a second threshold for the shot output, the second threshold being greater than the first threshold.

8. The method according to claim 7, wherein the video and data recording device records a video and data stream including
  a recording of a time prior to shooting device discharge in a range of 0 to 30 seconds; and
  a recording of a time around shooting device discharge in a range of 0 to 5 seconds;
  a recording of a time after shooting device discharge in a range of 0 to 30 seconds; or
  a combination thereof.

9. The method according to claim 7, wherein the video and data recording device records a video and data stream including
  a recording of a time prior to shooting device discharge in a range of 0 to a maximum time allowed by available memory; and
  a recording of a time around shooting device discharge in a range of 0 to a maximum time allowed by available memory;
  a recording of a time after shooting device discharge in a range of 0 to a maximum time allowed by available memory; or
  a combination thereof.

10. The method according to claim 7, wherein the wake-up output is activated by at least one global positioning (GPS) sensor.

11. The method according to claim 7, wherein the wake-up output is activated by at least one a gyroscope sensor.

12. The method according to claim 7, wherein the wake-up output is activated by an accelerometer sensor and at least one of a global positioning (GPS) sensor, a gyroscope sensor or a combination thereof.

13. A computer program product for controlling video and data recording of a camera mounted on a shooting device, the computer program product comprising a computer readable storage medium having program instructions embodied therewith, the program instructions executable by a computer to cause the computer to:
  operating a camera for recording video images of an aim of a shooting device;
  receiving one or more user inputs associated with one or more of environmental conditions, shooting conditions, shooting device characteristics, shot characteristics, desired data and video times, or a combination thereof;
  controlling a logic system including a plurality of logic functions by a digital signal generated inputs from an accelerometer and at least one additional non-accelerometer sensor type, wherein logic input to the plurality of logic functions is derived from sensor data to produce one or more logic function outputs, including a wake-up output to change the video and data recording system from a low power state to an operating mode in anticipation of a shot being fired by the shooting device and a shot output to start recording of a video by the camera, the shot output activated by an accelerometer sensor and at least one of a magnetic sensor, a gyroscope sensor, or a combination thereof, exceeding thresholds for sensor data, wherein the thresholds for sensor data are derived from the one or more user inputs; and
  initiating an operating mode from a low power state by the wake-up output and the video and data recording system begins recording in response to receiving the shot output and after the wake-up output is received; and
  wherein the thresholds for sensor data comprise at least a first threshold for the wake-up output and a second threshold for the shot output, the second threshold being greater than the first threshold.

14. The computer program product according to claim 13, wherein the video and data recording device records a video and data stream including
  a recording of a time prior to shooting device discharge in a range of 0 to 30 seconds; and
  a recording of a time around shooting device discharge in a range of 0 to 5 seconds;
  a recording of a time after shooting device discharge in a range of 0 to 30 seconds; or
  a combination thereof.

15. The computer program product according to claim 13, wherein the video and data recording device records a video and data stream including
  a recording of a time prior to shooting device discharge in a range of 0 to a maximum time allowed by available memory; and
  a recording of a time around shooting device discharge in a range of 0 to a maximum time allowed by available memory;

a recording of a time after shooting device discharge in a range of 0 to a maximum time allowed by available memory; or a combination thereof.

16. The computer program product according to claim 13, wherein the wake-up output is activated by at least one global positioning (GPS) sensor.

17. The computer program product according to claim 13, wherein the wake-up output is activated by an accelerometer sensor and at least one of a global positioning (GPS) sensor, a gyroscope sensor or a combination thereof.

\* \* \* \* \*